US 6,585,464 B2

(12) United States Patent
Eberling

(10) Patent No.: US 6,585,464 B2
(45) Date of Patent: Jul. 1, 2003

(54) PNEUMATIC CONTROL SYSTEM FOR TRAILER CONTAINER CHASSIS LATCHING

(75) Inventor: Charles E. Eberling, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/816,727

(22) Filed: Mar. 16, 2001

(65) Prior Publication Data

US 2002/0130488 A1 Sep. 19, 2002

(51) Int. Cl.$^7$ .................................................. B60P 1/64
(52) U.S. Cl. ............................. 410/77; 410/80; 410/82; 303/64
(58) Field of Search ........................ 410/77, 78, 80, 410/82; 280/460.1, DIG. 8; 303/30, 64, 85

(56) References Cited

U.S. PATENT DOCUMENTS

| | | | | |
|---|---|---|---|---|
| 3,892,436 A | * | 7/1975 | Fathauer | 294/81.53 |
| 3,909,069 A | * | 9/1975 | Durling | 303/9 |
| 3,924,544 A | * | 12/1975 | Grau et al. | 410/78 |
| 4,089,539 A | * | 5/1978 | Berger | 410/80 |
| 4,108,081 A | * | 8/1978 | Blanz | 410/82 |
| 4,114,718 A | * | 9/1978 | Lipshield | 180/89.14 |
| 4,472,001 A | * | 9/1984 | Fannin | 303/9 |
| 5,520,446 A | * | 5/1996 | Wilson et al. | 303/9.76 |

FOREIGN PATENT DOCUMENTS

| | | | | |
|---|---|---|---|---|
| DE | 2415165 A1 | * | 10/1975 | 410/77 |
| DE | 4232071 A1 | * | 3/1994 | 410/77 |
| DE | 19610374 A1 | * | 9/1996 | 410/77 |
| EP | 1036718 A2 | * | 9/2000 | 410/77 |

* cited by examiner

Primary Examiner—D. Glenn Dayoan
Assistant Examiner—Paul Chenevert
(74) Attorney, Agent, or Firm—Calfee, Halter & Griswold LLP

(57) ABSTRACT

A control system for a container chassis latching assembly of a trailer provides for initial pressurization of the latching assembly via the trailer supply line. Once a trailer reservoir is sufficiently charged, pressure is maintained for the latch assembly by the trailer reservoir. A preferred control valve interconnects the supply line with a supply port of the valve to provide the desired pressure at a delivery port. A control port of the valve is connected with the trailer reservoir and shuts off this flow once the trailer reservoir has reached a predetermined pressure. Thereafter, the latch assembly is maintained via air supplied from the trailer reservoir.

22 Claims, 1 Drawing Sheet

PNEUMATIC CONTROL SYSTEM FOR TRAILER CONTAINER CHASSIS LATCHING

BACKGROUND OF THE INVENTION

1. Field of Invention

This application relates to a latching system, particularly one used on a trailer container chassis, and more particularly to a pneumatic control system for such a latching system.

2. Discussion of the Art

A trailer supply line is provided on a trailer chassis and often used to directly supply compressed air from the compressed air system associated with the tractor for various functions associated with the trailer. For example, the supply line provides air to spring brake chambers and thereby release spring brakes that would otherwise be applied in the absence of the compressed air. Another common function is in association with an air operated latching assembly. Typically, air operated latch chambers are provided with compressed air from the supply line to connect the trailer container to the trailer chassis in a secure manner.

It is also common to employ a separate reservoir system for the trailer. The trailer reservoir system, again, allows a wide array of compressed air systems associated with the trailer to be operated from a reservoir having sufficient capacity to handle multiple tasks. As will be appreciated, the size or volume of the reservoir requires time to charge the reservoir to the desired operating pressure. Thus, compressed air systems on trailers that use the reservoir must account for the possibility that the compressed air will not be immediately available.

Known latching systems used on the trailer container chassis are either supplied by a trailer supply line or, separately, by a trailer reservoir system. Under the first scenario, the supply line feeds the latching network and a loss of the supply line results in the release of the latching mechanism, in addition to a trailer spring brake application. Under the latter system, the trailer reservoir system supplies the compressed air for the latching assembly and could result in an operator inadvertently pulling away with the latching system disengaged. Neither of these scenarios is desirable.

Accordingly, a need exists for an improved latching system for a trailer container chassis that overcomes the various inadequacies noted above.

SUMMARY OF THE INVENTION

The present invention provides an improved trailer container latching system that advantageously uses compressed air from the supply line and the trailer reservoir system.

A preferred embodiment of the trailer container latching system includes a supply line adapted for connection with the trailer supply line and a separate, trailer reservoir. A trailer container latching assembly is initially in selective communication with the trailer supply line, and subsequently with the trailer reservoir via a valve, the changeover operative at a predetermined pressure being attained in the trailer reservoir.

The control valve includes a first port connected with the supply line, a second port adapted for connection with the trailer reservoir, and a third port that selectively delivers air pressure to the latching assembly. A separate line interconnects the trailer reservoir and the container latching assembly.

A method of controlling the trailer container chassis latching system includes the steps of initially connecting the supply line to the latching assembly, charging the trailer reservoir, and interconnecting the trailer reservoir with the latching assembly once a predetermined pressure level is reached.

A primary advantage of the invention resides in the ability to ensure that the latch is secured initially upon departure.

Another advantage of the invention resides in the ability to use the trailer reservoir to maintain the latch chamber once the trailer reservoir system is adequately charged.

Still another advantage of the invention resides in the ability to maintain an adequate latching should a failure occur in the trailer supply line after the trailer reservoir system is charged.

Still other advantages and benefits of the invention will become apparent to those skilled in the art upon a reading and understanding of the following detailed description.

BRIEF DESCRIPTION OF THE DRAWING

The FIGURE shows a schematic representation of a pneumatic control system for trailer container chassis latching.

DETAILED DESCRIPTION OF THE PREFERRED EMBODIMENT

Figure 1:
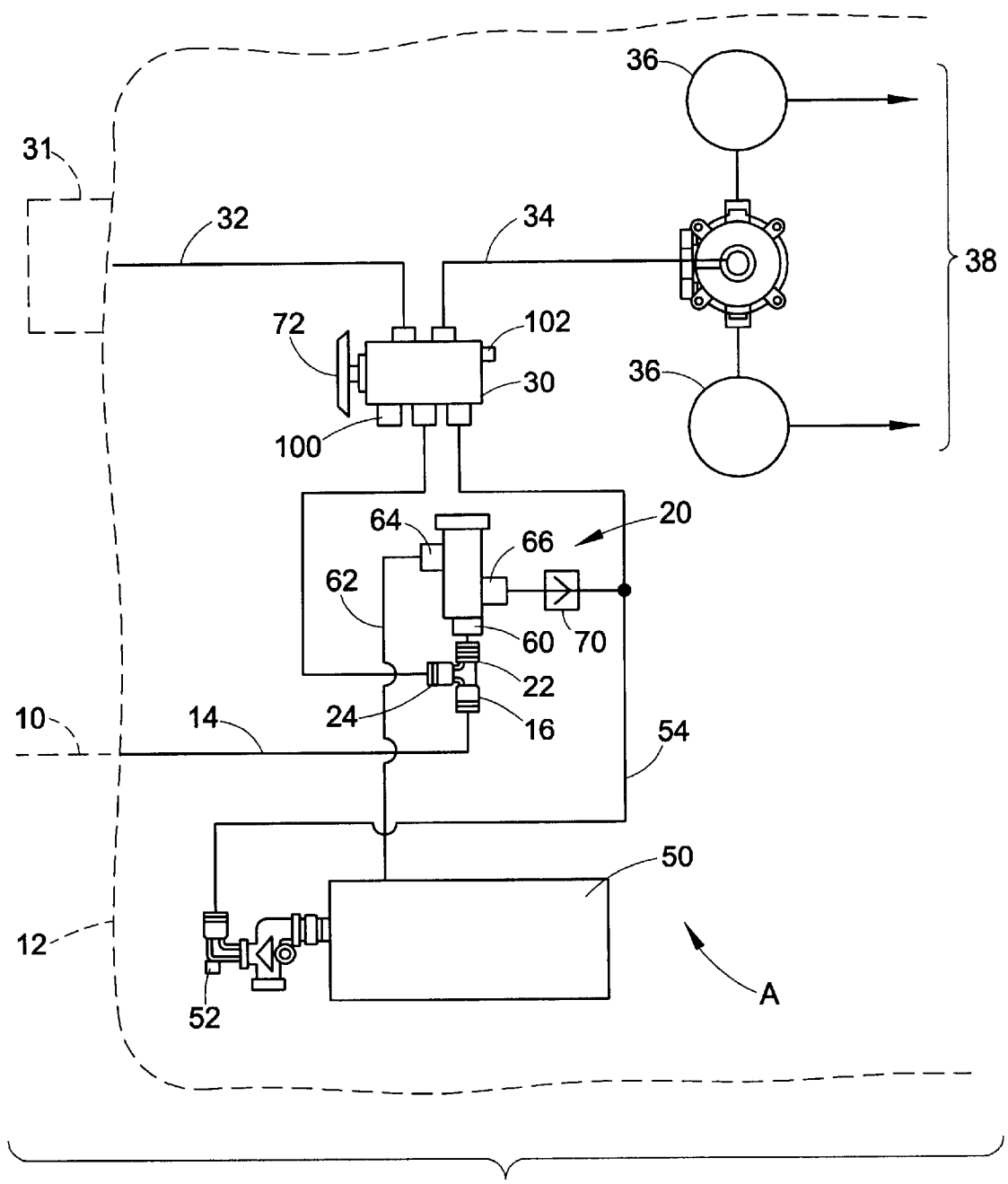

The FIGURE schematically represents the pneumatic control system A of the subject invention. Particularly, a trailer supply line 10 is shown in dotted line and represents the supply line as it leads from the tractor (not shown) of a tractor trailer system. A trailer 12 includes a supply line 14 adapted for operative connection with the supply line 10 from the tractor. Thus, when the tractor and trailer are connected together, a suitable connection (e.g., using connector fittings) is also made between the trailer supply line 10 and the supply line 14 to convey compressed air from the tractor for trailer use.

The supply line 14 is connected at its opposite end to a fitting, such as a T or divider 16. This fitting allows flow from the supply line 14 to reach control valve 20, as will be described further below, via a first branch 22. A second branch 24 of the fitting provides supply line pressure to a manually actuated latching valve 30. The latching valve communicates with spring brake chambers 31 associated with brakes of the trailer through line 32 and via line 34 with chambers 36 of a pneumatic latching assembly 38. The latching assembly is, in part, pneumatically operated and is well-known in the art so that further discussion herein is deemed unnecessary.

A trailer reservoir 50 is also provided and stores compressed air for various uses on the trailer. A pressure protection valve 52 opens to deliver pressure at a specified setting or pressure level to line 54 that leads from the reservoir to the latching valve 30. Thus, and as apparent from the FIGURE, line 54 assures that the trailer reservoir is in constant communication with the latching valve 30, and thus is available to supply pressurized air to the latching assembly 38. It will be appreciated, however, that during initial charging, the reservoir 50 may not be immediately available to supply compressed air to the latching assembly. In accordance with the features of the present invention, the supply line 14 assures that compressed air is at least initially supplied from the trailer supply line 10 of the tractor. As indicated above, the supply line communicates through the branch 22 of the fitting with the control valve, particularly, a first or supply port 60 of the control valve. The trailer reservoir also communicates via line 62 with a second or control port 64 of the control valve. The pressure of the trailer reservoir is essentially monitored at the control port 64. Once the trailer reservoir reaches a predetermined minimum pressure, the control valve is switched due to sufficient pressure at the control port 64 and shuts off the flow from the supply line 14 to a third or delivery port 66 of the control valve. Thus, the supply port 60 and delivery port 66 are normally disposed in operative communication so that compressed air is available to the latching assembly 38 from the supply line 14. This assures that a latch is initially secured on departure, since the trailer supply line pressurizes the latching assembly. When the trailer reservoir is charged, control port 64 shuts off the trailer supply line and adequate pressure is provided via line 54 to maintain the latching assembly 38. This has the additional benefit that if the trailer supply line is lost at this point, it does not result in a loss of the latching mechanism since the trailer reservoir system maintains the required compressed air supply for the latching assembly. A check valve 70 is additionally interposed between the third or delivery port 66 and line 54 to allow air flow in the direction of the arrow and complete the supply path to the latch assembly during initial start up.

As briefly noted above, the supply line 14 also communicates with the spring brake chambers via line 32 extending from the latching valve 30. Air flows from the latching valve 30 through line 32 and into the spring break chambers 31. The latch pressure and spring break pressure are also exhausted by pulling or actuating the handle 72 to an unlatched position. Upon actuation of handle 72, pressure is simultaneously exhausted from the spring break chamber 31 and the latching chambers 36 through exhaust ports 100 and 102, respectively. This control configuration has the additional advantage that if the latching valve 30 is inadvertently actuated, for example by pulling on the handle 72, an automatic parking of the trailer occurs if, in fact, it is not already parked.

Thus, the trailer container chassis is assured of compressed air from either the trailer supply line or the trailer reservoir in accordance with the preferred embodiment and the method of latching as described. Unlike known latching systems that are supplied by either the trailer supply line or the trailer reservoir system, once the trailer reservoir is sufficiently charged, it maintains the latch chamber and shuts off flow from the trailer supply line. Thus, even if the trailer supply line is subsequently lost during vehicle operation, the latching mechanism is maintained via the reservoir.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A trailer container chassis latching system comprising:
    a supply line adapted for connection with a trailer supply line:
    a trailer reservoir for storing compressed air for trailer use;
    a latching assembly for connecting a trailer container to a trailer chassis; and
    a valve in operative communication with the supply line, the trailer reservoir, and the latching assembly, wherein the valve is adapted to initially supply air from the supply line to the latching assembly and then supply air from the trailer reservoir to the latching assembly once a predetermined pressure is attained in the trailer reservoir.

2. The trailer container chassis latching system of claim 1 wherein the valve includes a first port adapted for connection with the supply line, a second port adapted for connection with the trailer reservoir, and a third port adapted to selectively deliver air pressure to the latching assembly.

3. The trailer container chassis latching system of claim 2 further comprising a separate line interconnecting the trailer reservoir and the latching assembly.

4. The trailer container chassis latching system of claim 2 wherein the second port acts as a control port and, in response to reaching the predetermined pressure in the trailer reservoir, shuts off communication between the first and third ports.

5. The trailer container chassis latching system of claim 2 wherein the first and third port communicate with one another until the trailer reservoir reaches the predetermined pressure.

6. The trailer container chassis latching system of claim 1 further comprising an actuating member interposed between the valve and latching assembly for selectively applying and releasing the latch assembly.

7. The trailer container chassis latching system of claim 6 wherein the actuating member is operatively connected in the supply line to the spring brakes so that the spring brakes are applied upon release of the latch assembly.

8. The trailer container chassis latching system of claim 7 wherein the supply lines includes a divider to simultaneously supply the valve and actuating member.

9. The trailer container chassis latching of claim 1, wherein said valve supplies air to said latching assembly when the pressure in the trailer reservoir is below said predetermined pressure.

10. A method of controlling a trailer container chassis latching system which includes a supply line, a trailer reservoir, and pneumatic latching assembly comprising the steps of:
    initially connecting the supply line to the latching assembly;
    charging the trailer reservoir; and
    interconnecting the trailer reservoir with the latching assembly once the trailer reservoir reaches a predetermined pressure level.

11. The method of claim 10 comprising the further step of applying spring brakes associated with the trailer chassis if the latching assembly is disconnected.

12. The method of controlling a trailer container chassis latching system of claim 10, further comprising the step of disconnecting supply line from the latching system when the pressure in the trailer reservoir is above said predetermined pressure.

13. A control system for a container chassis latching assembly of a trailer comprising:
    a tractor supply line adapted for operative connection with a trailer supply line to provide compressed air to the trailer;
    a trailer reservoir mounted on the trailer for storing compressed air for trailer use;
    a pneumatic reservoir mounted on the trailer for storing compressed air for trailer use;
    a pneumatic latch assembly for securing the trailer container to an associated trailer chassis; and
    a control valve of selectively interconnecting the latch assembly to one of the supply line and the trailer reservoir whereby the latching assembly is initially connected to the supply line and subsequently connected to the trailer reservoir once a predetermined pressure is reached in the trailer reservoir.

14. The control system of claim 13 wherein the control valve includes a control port in communication with the trailer reservoir for shutting off delivery of compressed air from the supply line once the predetermined pressure is reached in the trailer reservoir.

15. The control system of claim 14 wherein the control valve includes a supply port in communication with the supply line and a delivery port in communication with the latch assembly.

16. The control system of claim 13 wherein the control valve includes a supply port in communication with the supply line and a delivery port in communication with the latch assembly.

17. The control system of claim 13 wherein the supply line includes a divider upstream of the control valve whereby compressed air is simultaneously directed toward the latch assembly and one or more spring brake chambers associated with the trailer spring brakes.

18. The control system of claim 13 further comprising a latching valve interposed between the control valve and the latch assembly for selectively, manually latching and unlatching the latch assembly.

19. The control system of claim 18 wherein the latching valve interconnects one or more spring brake chambers with one or more exhaust ports when the latch assembly is in an unlatched position.

20. The control system of claim 18 wherein the control valve includes a control port connected to the trailer reservoir, a supply port connected to the supply line, and a delivery port leading to the latch assembly.

21. The control system of claim 20 wherein the trailer reservoir is interconnected with the delivery port of the control valve and the latch assembly.

22. A trailer container chassis latching system comprising:
   a supply line in connection with a trailer supply line;
   a trailer reservoir for storing compressed air;
   a latching assembly for securing a trailer container to a trailer chassis;
   a valve in operative communication with the supply line, the trailer reservoir, and the latching assembly; and
   an actuating member interposed between said valve and said latching assembly for selectively applying and releasing the latch assembly, wherein said actuating member is connected to spring brakes such as to actuate the spring brakes upon the release of the latch assembly.

* * * * *